(12) United States Patent
Khanna et al.

(10) Patent No.: US 11,762,710 B2
(45) Date of Patent: Sep. 19, 2023

(54) MULTITHREADED ROUTE PROCESSING FOR ROUTING INFORMATION DISPLAY

(71) Applicant: Juniper Networks, Inc., Sunnyvale, CA (US)

(72) Inventors: Sanjay Khanna, Cary, NC (US); Srinivas Ramprasad, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 24 days.

(21) Appl. No.: 17/139,680

(22) Filed: Dec. 31, 2020

(65) Prior Publication Data

US 2021/0397487 A1 Dec. 23, 2021

(30) Foreign Application Priority Data

Jun. 23, 2020 (IN) .............................. 202041026439

(51) Int. Cl.
*G06F 9/52* (2006.01)
*G06F 9/50* (2006.01)
(Continued)

(52) U.S. Cl.
CPC .................. *G06F 9/52* (2013.01); *G06F 3/14* (2013.01); *G06F 9/5083* (2013.01); *H04L 69/325* (2013.01)

(58) Field of Classification Search
CPC . G06F 9/52; G06F 3/14; G06F 9/5083; H04L 69/325; G09G 2360/06; G09G 2360/08; G09G 2370/022; G09G 2370/025
See application file for complete search history.

(56) References Cited

U.S. PATENT DOCUMENTS 6,392,997 B1   5/2002   Chen
6,810,427 B1 * 10/2004   Cain ...................... H04L 45/60
                                                                    709/238
(Continued)

FOREIGN PATENT DOCUMENTS

CN    101741705 A   6/2010
CN    102394809 A   3/2012
(Continued)

OTHER PUBLICATIONS

Schweizer et al., "Evaluating the Cost of Atomic Operations on Modern Architectures," published by the Institute of Electrical and Electronics Engineers (IEEE) on Mar. 10, 2016, 12 pp.
(Continued)

*Primary Examiner* — Jorge A Chu Joy-Davila
(74) *Attorney, Agent, or Firm* — Shumaker & Sieffert, P.A.

(57) ABSTRACT

In some examples, a main thread of a plurality of execution threads executing on a plurality of processing cores of at least one hardware-based processor of a network device may receive a request for information associated with network routes that meet one or more criteria. Each of the plurality of execution threads may process a respective routing information partition to generate respective displayable information associated with a respective subset of the network routes that meets the one or more criteria. The main thread may generate consolidated displayable information associated with the network routes that meet the one or more criteria based on the respective displayable information generated by each of the plurality of execution threads. The main thread may output the consolidated displayable information associated with the network routes that meet the one or more criteria for display at a display device.

14 Claims, 3 Drawing Sheets

(51) Int. Cl.
*H04L 69/325* (2022.01)
*G06F 3/14* (2006.01)

(56) References Cited

U.S. PATENT DOCUMENTS

| | | | |
|---|---|---|---|
| 7,184,437 B1 | 2/2007 | Cole et al. | |
| 7,245,619 B1 | 7/2007 | Guan et al. | |
| 7,334,048 B1 | 2/2008 | Guan et al. | |
| 7,359,393 B1 | 4/2008 | Nalawade et al. | |
| 7,499,459 B1 | 3/2009 | Scudder et al. | |
| 7,558,877 B1 | 7/2009 | Fedyk et al. | |
| 7,675,912 B1 | 3/2010 | Ward et al. | |
| 8,085,272 B1 * | 12/2011 | Molnar | G06T 15/005 345/534 |
| 8,937,961 B1 | 1/2015 | Vairavakkalai | |
| 10,642,650 B2 | 5/2020 | Wang et al. | |
| 2003/0110289 A1 | 6/2003 | Kamboh et al. | |
| 2004/0160969 A1 | 8/2004 | Moon et al. | |
| 2005/0074003 A1 | 4/2005 | Ball et al. | |
| 2005/0135256 A1 | 6/2005 | Ball et al. | |
| 2005/0169281 A1 | 8/2005 | Ko et al. | |
| 2006/0233181 A1 | 10/2006 | Raszuk et al. | |
| 2007/0064698 A1 | 3/2007 | Appanna | |
| 2007/0274302 A1 * | 11/2007 | Moriya | G06F 11/1441 370/360 |
| 2009/0182896 A1 | 7/2009 | Patterson et al. | |
| 2011/0231854 A1 * | 9/2011 | Augenstein | G06F 9/50 718/103 |
| 2011/0242991 A1 | 10/2011 | Zhang et al. | |
| 2012/0063460 A1 | 3/2012 | Hallivuori | |
| 2012/0263049 A1 | 10/2012 | Venkatachalapathy et al. | |
| 2013/0111175 A1 * | 5/2013 | Mogul | H04L 47/10 711/E12.001 |
| 2014/0075048 A1 | 3/2014 | Yuksel et al. | |
| 2016/0352619 A1 | 12/2016 | Gattani | |
| 2017/0207963 A1 | 7/2017 | Mehta et al. | |
| 2019/0179668 A1 | 6/2019 | Wang et al. | |
| 2021/0067463 A1 | 3/2021 | Mukhopadhyay et al. | |
| 2021/0120109 A1 | 4/2021 | Ranpise et al. | |
| 2021/0024311 A1 | 8/2021 | Dutta | |

FOREIGN PATENT DOCUMENTS

| | | |
|---|---|---|
| CN | 102752198 A | 10/2012 |
| CN | 105812276 A | 7/2016 |
| CN | 107343302 A | 11/2017 |
| WO | 2012083704 A1 | 6/2012 |

OTHER PUBLICATIONS

Brands et al., "Parallelization of BGP for route server functionality—a protocol and implementation study," amsix Amsterdam Internet Exchange, MSc Research Project System and Network Engineering, Aug. 4, 2017, 51 pp.

Ishida, "GoBGP: yet another OSS BGPd," NTT Software Innovation Center, RIPE-71, retrieved from https://ripe71.ripe.net/presentations/135-RIPE71_GoBGP.pdf, Nov. 2015, 26 pp.

Lei et al., "An Improved Parallel Access Technology on Routing Table for Threaded BGP," 2009 15th International Conference on Parallel and Distributed Systems, Dec. 1, 2009, 7 pp.

Liu et al., "MR-PBGP: a Multi-Root Tree Model for Parallel BGP," 2012 IEEE 14th International Conference on High Performance Computing and Communications, Jun. 25, 2012, 8 pp.

U.S. Appl. No. 15/930,171, filed May 12, 2020, entitled "Lockless Management of Immutable Objects by Multi-Threaded Processes", Juniper Networks Inc., inventors Loganathan et al.

U.S. Appl. No. 16/836,436, filed Mar. 31, 2020, entitled "Border Gateway Protocol Update Packing for a Distributed Routing Information Base", Juniper Networks Inc., inventors Loganathan et al.

* cited by examiner

```
┌─────────────────────────────────────────────────────────┐
│ RECEIVE, BY A MAIN THREAD OF A PLURALITY OF EXECUTION   │
│ THREADS EXECUTING ON THE PLURALITY OF PROCESSING        │─ 202
│ CORES, A REQUEST FOR INFORMATION ASSOCIATED WITH        │
│ NETWORK ROUTES THAT MEET ONE OR MORE CRITERIA           │
└─────────────────────────────────────────────────────────┘
                            │
                            ▼
┌─────────────────────────────────────────────────────────┐
│ PROCESS, BY EACH OF THE PLURALITY OF EXECUTION          │
│ THREADS, A RESPECTIVE ROUTING INFORMATION PARTITION     │
│ TO GENERATE RESPECTIVE DISPLAYABLE INFORMATION          │─ 204
│ ASSOCIATED WITH A RESPECTIVE SUBSET OF THE NETWORK      │
│ ROUTES THAT MEETS THE ONE OR MORE CRITERIA              │
└─────────────────────────────────────────────────────────┘
                            │
                            ▼
┌─────────────────────────────────────────────────────────┐
│ GENERATE, BY THE MAIN THREAD, CONSOLIDATED DISPLAYABLE  │
│ INFORMATION ASSOCIATED WITH THE NETWORK ROUTES THAT     │
│ MEET THE ONE OR MORE CRITERIA BASED ON THE RESPECTIVE   │─ 206
│ DISPLAYABLE INFORMATION GENERATED BY EACH OF THE        │
│ PLURALITY OF EXECUTION THREADS                          │
└─────────────────────────────────────────────────────────┘
                            │
                            ▼
┌─────────────────────────────────────────────────────────┐
│ OUTPUT, BY THE MAIN THREAD FOR DISPLAY AT A DISPLAY     │
│ DEVICE, THE CONSOLIDATED DISPLAYABLE INFORMATION        │─ 208
│ ASSOCIATED WITH THE NETWORK ROUTES THAT MEET THE ONE    │
│ OR MORE CRITERIA                                        │
└─────────────────────────────────────────────────────────┘
```

FIG. 3

MULTITHREADED ROUTE PROCESSING FOR ROUTING INFORMATION DISPLAY

This application claims the benefit of IN Provisional Application No. 202041026439 filed Jun. 23, 2020, the entire content of which is herein incorporated by reference.

TECHNICAL FIELD

This disclosure generally relates to computer networks and, more specifically, to network routing protocol route processing.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes for the network. In general, a route indicates reachability information for a network prefix. From the routing information, the routers may generate forwarding information, which is used by the routers to relay packet flows through the network and, more particularly, to relay the packet flows to a next hop. In reference to forwarding a packet, the "next hop" from a network router typically refers to a downstream neighboring device for a given route. Upon receiving an incoming packet, the router examines information within the packet to identify the destination for the packet. Based on the destination, the router forwards the packet in accordance with the forwarding information.

SUMMARY

In general, the disclosure describes techniques for distributing processing of network routes among multiple execution threads of a network device to determine network routes that meet one or more criteria and to generate displayable information associated with those network routes. Specifically, a network device may receive, from a computer device via an interface, a request for information associated with network routes that meet one or more criteria. The network device may distribute the processing of the request among multiple execution threads that each processes a portion of the network routes stored by the network device to determine the network routes that meet the one or more criteria. The network device may thereafter output the information associated with network routes that meet one or more criteria back to the computing device.

The multiple execution threads of the network device may generate information associated with the network routes in a displayable form. That is, the multiple execution threads may generate information that is readable by users of the computing device, such as by generating textual information that describes the associated network routes.

As the multiple execution threads of the network device process the network routes to determine the network routes that meet the one or more criteria, a main thread of the network device may continuously receive, from the multiple execution threads, information associated with network routes that meet one or more criteria and may output the information via the interface for display at the computing device. The main thread of the network device may continuously stream the information associated with network routes produced by the multiple execution threads to the computing device to provide the computing device with a consistent stream of information that is responsive to the computing device's request.

The network device may output the information associated with network routes for a request in a lexicographic order. That is, the network device may output the requested information associated with network route in an order specified by the associated request. For example, the network device may output the information associated with network routes in order based on the destination network addresses associated with the network routes, such as in ascending order starting with the information associated with the network route having the smallest destination network address, or in descending order starting with the information associated with the network route having the largest destination network address. By sorting the information associated with network routes that are outputted to the computing device, the network device may relieve the computing device from having to perform such sorting of the information, thereby reducing the amount of processing overhead in the computing device for displaying the information associated with network routes.

The use of multiple execution threads may potentially enable the network device to concurrently process multiple requests for information associated with network routes from the same computing device or from multiple different computing devices. For example, the network device may, for each request received by the network device, spawn a set of execution threads to generate information responsive to the request. As the network device receives multiple requests from the same computing device or from multiple different computing devices, the network device may spawn sets of execution threads to concurrently generate information responsive to each of the requests received by the network device.

The network device may start streaming information associated with network routes produced by the multiple execution threads to the computing device as soon as they are produced. That is, as soon as a thread produces a piece of information associated with a network route that is responsive to the request, the network device, the network device may stream such information to the computing device. This may potentially increase the responsiveness of the computing device by decreasing the lag between the computing device sending a request for information to the network device and the computing device receiving from the network device and displaying the requested information. Such a potential increase in the responsiveness of the computing device in starting to receive the requested information may, for example, prevent an application of the computing device from timing out before the application starts to receive the requested information from the network device.

In addition, the network device may throttle one or more of the multiple execution threads based on the rate at which the one or more of the multiple execution threads produce information associated with network routes to control the flow of information between the multiple execution threads of network device and to control the flow of information between the network device and the computing device. The network device may identify one or more bottlenecks in the multiple execution threads and may throttle one or more execution threads that are producing information faster than other execution threads in order to ensure that the network device can output a smooth stream of information to the computing device and to reduce the amount of memory that may be required to buffer information produced by the one or more execution threads.

The techniques may provide one or more advantages. For example, by distributing the processing of the request amongst multiple execution threads executing on multiple processing cores, such processing including potentially processor-intensive tasks such as traversing routing information bases and generating information that is displayable to users, the techniques may decrease the utilization of any one single processing core, parallelize the processing among multiple processing cores, and may decrease the amount of time required by network device to process the request. In another example, by throttling one or more execution threads the techniques may reduce the amount of memory used by the throttled one or more execution threads and reduce the size of data structures used to organize information produced by the throttled one or more execution threads.

In one example, a method includes receiving, by a main thread of a plurality of execution threads executing on a plurality of processing cores of at least one hardware-based processor of a network device, a request for information associated with network routes that meet one or more criteria. The method further includes processing, by each of the plurality of execution threads, a respective routing information partition to generate respective displayable information associated with a respective subset of the network routes that meets the one or more criteria. The method further includes generating, by the main thread, consolidated displayable information associated with the network routes that meet the one or more criteria based on the respective displayable information generated by each of the plurality of execution threads. The method further includes outputting, by the main thread for display at a display device, the consolidated displayable information associated with the network routes that meet the one or more criteria.

In one example, a network device includes a network interface card. The network device further includes at least one hardware-based processor comprising a plurality of processing cores for executing a plurality of execution threads, the at least one hardware-based processor configured to: receive, by a main thread of a plurality of execution threads executing on the plurality of processing cores, a request for information associated with network routes that meet one or more criteria; process, by each of the plurality of execution threads, a respective routing information partition to generate respective displayable information associated with a respective subset of the network routes that meets the one or more criteria; generate, by the main thread, consolidated displayable information associated with the network routes that meet the one or more criteria based on the respective displayable information generated by each of the plurality of execution threads; and output, by the main thread for display at a display device, the consolidated displayable information associated with the network routes that meet the one or more criteria.

In one examples, a non-transitory computer-readable medium includes instructions that, when executed, cause one or more hardware-based processors of one or more network devices to perform operations including: receiving, with a main thread of a plurality of execution threads configured for execution on a plurality of processing cores of the one or more hardware-based processors of a network device, a request for information associated with network routes that meet one or more criteria; processing, by each of the plurality of execution threads, a respective routing information partition to generate respective displayable information associated with a respective subset of the network routes that meets the one or more criteria; generating, by the main thread, consolidated displayable information associated with the network routes that meet the one or more criteria based on the respective displayable information generated by each of the plurality of execution threads; and outputting, by the main thread for display at a display device, the consolidated displayable information associated with the network routes that meet the one or more criteria.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
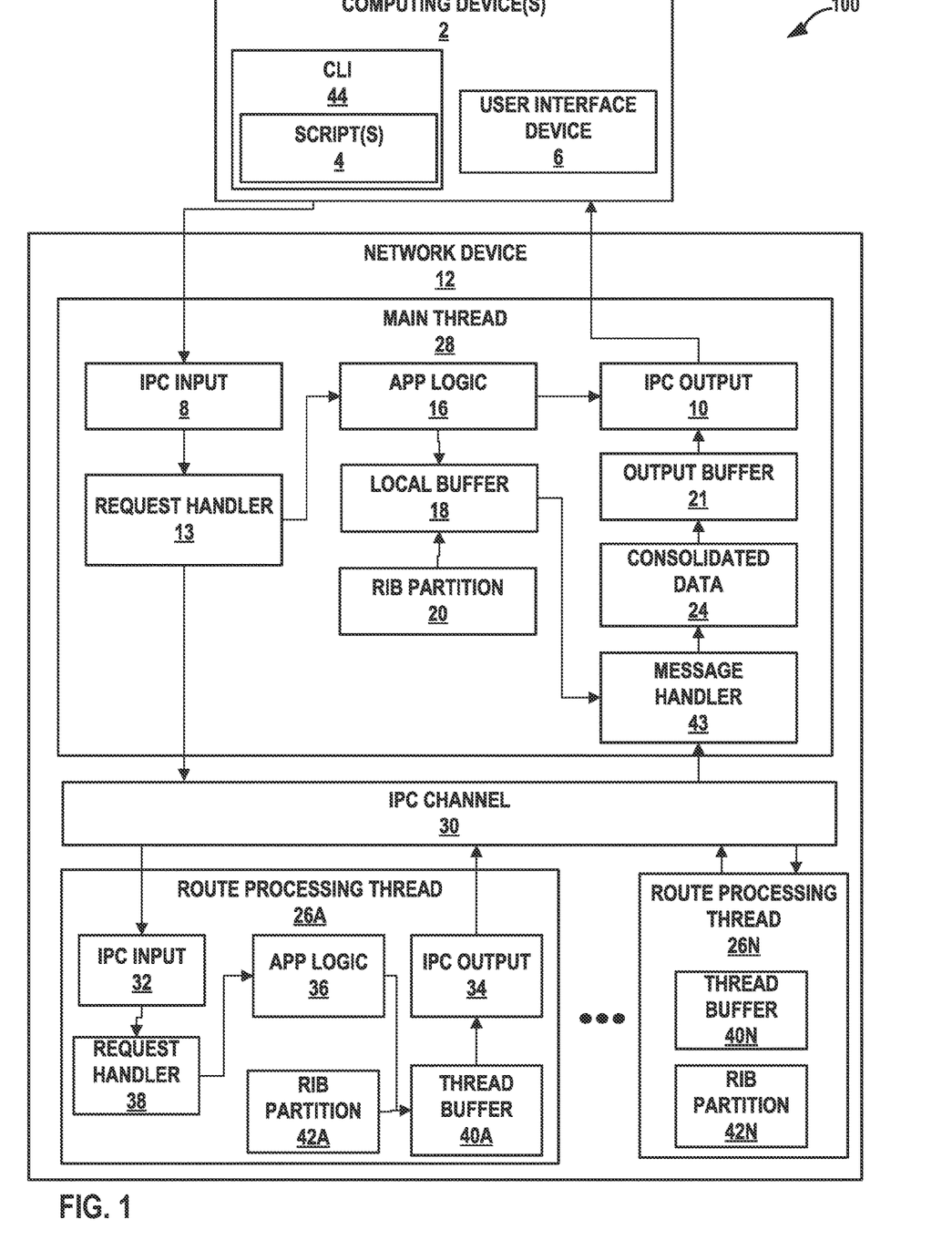
FIG. 1 is a block diagram illustrating an example environment according to techniques of this disclosure.

FIG. 1 is a block diagram illustrating an example environment according to techniques of this disclosure. As shown in FIG. 1, system 100 includes computing device 2 that communicates with network device 12 over a network, such as a Local Area Network, a Wide Area Network, the Internet, and the like.

Computing device 2 may be a computing device including but not limited to desktop computers, laptop computers, mobile computing devices, smart phones, personal digital assistants (PDAs), tablet computing devices, and the like. Computing device 2 may include user interface device 6 that includes an input device such as a keyboard, a mouse, a touchscreen, and the like through which users may interact with computing device 2 to provide user input to computing device 2. User interface device 6 may also include an output device, such as a display device, through which computing device 2 may display information that is viewable by users of computing device 2.

Network device 12 may represent a router, route reflector, or other network device that is connected via one or more network links to other network devices that advertise routes to the network device 12. For example, network device 12 may be a core or edge router of a service provider network, enterprise network, edge network such as a data center network, an access router, a controller, a real or virtual server or other compute node configured to execute a route or route reflector, or a route reflector of any of the aforementioned networks or other network.

Computing device 2 may send requests for network routing information to network device 12. In particular, computing device 2 may send a request for network routing information associated with one or more network routes stored at network device 12. The request may specify one or more criteria for the network routing information to be returned from network device 12, so that network device 12 may return only network routing information associated with network routes that meet the one or more criteria. For example, if the one or more criteria specifies active routes, network device 12 may return only network routing information associated with active routes. In another example, if the one or more criteria specifies a specific next hop, network device 12 may return only network routing information associated with network routes having the specified next hop.

Computing device 2 may receive user input via user interface device 6, such as via a user interface outputted through user interface device 6. In some examples, computing device 2 may execute a command line interface (CLI) 44 for sending requests to network device 12. Users of the computing device may provide input into CLI 44, such as by typing one or more commands via user interface 6. For example, the input into CLI 44 may be one or more commands that computing device 2 sends as one or more requests to network device 12. In some examples, the input may be one or more commands to execute one or more scripts 4 which computing device 2 may execute to send one or more requests to network device 12.

In accordance with aspects of the present disclosure, network device 12 may receive a request for network routing information from computing device 2. In response to network device 12 receiving the request for network routing information, the hardware processing cores of one or more processors of network device 12 may execute multiple software execution threads to perform operations to generate the network routing information requested by computing device 2 that meet the one or more criteria specified by the request. Computing device 2 may output the generated network routing information to computing device 2 for display at user interface device 6. For example, computing device 2 may output the network routing information as textual information that is presented within CLI 44.

Network device 12 may send network routing information requested by computing device 2 to computing device 2 as soon as network device 12 generates the network routing information. That is, network device 12 may, as soon as network device 12 has generated a portion of the network routing information requested by computing device 2, send the portion of the network routing information to computing device 2. For example, if the request for network routing information received by network device 12 is a request for information regarding destination network addresses that meet the one or more criteria specified by the request, network device 12 may, as soon as network device 12 determines information regarding a destination network address responsive to the request, output the information regarding the destination network address to computing device 2. As network device 12 determines information regarding additional destination network addresses that are responsive to the request, network device 12 may continue to output such information regarding additional destination network addresses to computing device 2 as soon as such information is determined by network device 12.

In this way, network device 12 may, in response to receiving a request for network routing information from computing device 2, operate to continuously stream portions of network routing information that are responsive to the request to computing device 2 as network device 12 determines such portions of network routing information. Correspondingly, computing device 2 may output for display such portions of network routing information as soon as computing device 2 receives such portions of network routing information from network device 12, thereby increasing the perceived responsiveness of computing device 2 to users of computing device 2 and decreasing the amount of lag between sending the request to network device 12 and receiving portions of the network routing information that are responsive to the request.

Network device 12 may be able to output the network routing information responsive to a request in lexicographic order. That is, network device 12 may be able to output the network routing information in an order that may be specified by the request. For example, network device 12 may output the network routing information that is responsive to a request in ascending order of destination network addresses, starting from the network routing information associated with the smallest destination network address. In another example, network device 12 may output the network routing information that is responsive to a request in descending order of destination network addresses, starting from the network routing information associated with the largest destination network address out of the network routing information.

Computing device 2 may send multiple requests for network routing information to network device 12. Similarly, two or more computing devices, including computing device 2, may be able to each send one or more requests for network routing information to network device 2. Network device 12 may be able to receive a plurality of requests for network routing information from computing device 2 or from two or more computing devices and may be able to perform operations to generate network routing information for each of the plurality of requests. In some examples, network device 12 may perform the techniques of disclosure to execute multiple software processes to perform operations to generate network routing information for at least two or more of the plurality of requests substantially in parallel. That is, network device 12 may be able to execute a first one or more software processes to perform operations to generate network routing information for a first request and may execute a second one or more software processes at least partially in parallel with the first one or more software processes to perform operations to generate network routing information for a second request.

Network device 12 may include a multi-core computing environment that includes one or more multi-core processors, such that each of the one or more multi-core processors may include multiple hardware processing cores. The multiple hardware processing cores of network device 12 may execute multiple processes, such as multiple software execution threads, to perform operations to service the one or more requests. The multiple software execution threads may include main thread 28 and route processing threads 26A-26N. Main thread 28 and processing threads 26A-26N may execute on a plurality of hardware processing cores across one or more processors of network device 12 to process network routes stored in network device 12.

Specifically, each of processing threads 26A-26N may execute to process a subset of the network routes stored in network device 12. In some cases, main thread 28 may also process a subset of the network routes stored in network device 12.

While network device 12 is described herein as executing software execution threads, such as main thread 28 and route processing threads 26A-26N, network device 12 may equally execute multiple processes in forms other than threads in a similar manner as the techniques described herein. Software execution threads such as main thread 28 and route processing threads 26A-26N are just some non-limiting examples of the processes that network device 12 may execute to perform the techniques of this disclosure, and the techniques described herein as being performed by main thread 28 and route processing threads 26A-26N may equally be performed by any other form of processes that may be executed by one or more hardware processing cores of the multi-core processors of network device 12.

As described further below, main thread 28 and route processing threads 26A-26N of network device 12 may execute similar code elements, thereby enabling code reuse with a minimal amount of modification to the code. Main thread 28 may also operate in a variety of different modes depending on whether network device 12 executes route processing threads 26A-26N to service the one or more requests received from computing device 2 via multiple software execution threads. When network device 12 operates to service the one or more requests received from computing device 2 without route processing threads 26A-26N, main thread 28 may operate in a mode to service the one or more requests received from computing device 2 by generating the requested network routing information without using route processing threads 26A-26N.

When network device 12 operates to service the one or more requests received from computing device 2 by executing route processing threads 26A-26N, operate in a mode to generate network routing information from a corresponding subset of network routes. Similarly, each of route processing threads 26A-26N may operate in a mode to generate network routing information from a corresponding subset of network routes. Main thread 28 may therefore operate in a mode to sort the consolidated network routing information generated by main thread 28 and each of route processing threads 26A-26N for output to computing device 2.

Main thread 28 may act as a proxy to relay requests received from CLI 44 of computing device 2 to route processing threads 26A-26N so that route processing threads 26A-26N may, in parallel, generates the network routing information requested by computing device 2. As route processing threads 26A-26N processes a request relayed by main thread 28 from computing device 2 to generate the network routing information, route processing threads 26A-26N may stream the network routing information it has generated back to main thread 28. From the moment main thread 28 receives the network routing information from route processing threads 26A-26N, main thread 28 may continuously relay such network routing information back to CLI 44 of computing device 2, thereby increasing the responsiveness of CLI 44 regardless of the total amount of network routing information that network device 12 sends to computing device 2.

Increasing the responsiveness of CLI 44 by minimizing the delay of CLI 44 in receiving and displaying network routing information may enable CLI 44 to provide a responsive user interface for users and may enable CLI 44 to provide continuous data to one or more scripts 4.

In the example of FIG. 1, main thread 28 may execute inter-process communication (IPC) input 8 to receive a request for network routing information from, for example, CLI 44 of computing device 2. The request may include a request for information associated with network routes stored by network device 12. For example, the request may include a "show route" command. The request may include one or more criteria that are met by one or more of the network routes stored by network device. The criteria may also be referred to herein as "filters."

Main thread 28 may execute request handler 13 to relay the request received from computing device 2 to a plurality of software execution threads to perform operations to generate the network routing information requested by computing device 2. For example, main thread 28 may execute request handler 13 to relay the request received from computing device 2 to route processing threads 26A-26N and to application logic 16 executed by main thread 28, so that each of main thread 28 and route processing threads 26A-26N may perform operations to produce the network routing information requested by computing device 2. Main thread 28 may relay metadata associated with the request, such as an indication of the one or more criteria specified by the request, to route processing threads 26A-26N and to application logic 16 so that route processing threads 26A-26N and main thread 28 may be able to perform filtering of network routes that meet the one or more criteria.

Main thread 28 may relay the request received from computing device 2 and associated metadata to route processing threads 26A-26N via IPC channel 30. Although referred to as a channel, IPC channel 30 may represent any type of inter-thread communication, such as a message bus, message queues, message passing, a file, shared memory or buffer, socket, and so forth.

Each of route processing threads 26A-26N may receive the request and associated metadata relayed from main thread 28 and may perform operations to produce the network routing information requested by computing device 2. For example, route processing thread 26A may execute IPC input 32 to receive the request relayed from main thread 28. Route processing thread 26A may, in response to IPC input 32 receiving the request, execute input handler 38 to handle the received request and to spawn application logic 36 to perform operations to produce the network routing information requested by computing device 2.

Network device 12 may store routing information, such as routes to network destinations and other associated information, from which network device 12 may determine the network routing information requested by computing device 2. Network device 12 may store such routing information in the form of a routing table, a routing information base (RIB), and a like. In some examples, network device 12 may partition a RIB into subsets of partitions that each stores a different non-overlapping portion of routes that make up the overall RIB. Each of the plurality of software execution threads executed by network device 12 (e.g., to route processing threads 26A-26N and main thread 28) may perform operations on a different RIB partition. As such, each of main thread 28 and route processing threads 26A-26N may perform operations on a respective RIB partition in order to produce the network routing information requested by computing device 2. For example, main thread may perform operations on RIB partition 20 while route processing thread 26A may perform operations on RIB partition 42A. Each of route processing threads 26A-26N may perform operations on a corresponding RIB partition. Thus, for example, route processing thread 26N may also perform operations on RIB partition 42N.

Each of route processing threads 26A-26N and main thread 28 may process a respective routing information partition to generate respective displayable information associated with a respective subset of the network routes that meets the one or more criteria specified by the request sent by computing device 2. In particular, each of route processing threads 26A-26N and main thread 28 may produce the network routing information requested by computing device 12 based on a respective subset of network information stored by a respective RIB partition For example, main thread 28 may execute application logic 16 to produce the requested network routing information for the subset of network routes stored in RIB partition 20 to service the request for network routing information. Similarly, route processing thread 26A may execute application logic 36 to produce the requested network routing information for the subset of network routes stored in RIB partition 42A.

To produce the requested network routing information, each of route processing threads 26A-26N and main thread 28 may process a respective RIB partition to determine the network routes stored in the respective RIB partition that meets the criteria of the request for network routing information and may output, in order, the network routes stored in the respective RIB partition that meets the criteria of the request for network routing information. For example, main thread 28 may execute application logic 16 to process RIB partition 20 to determine the network routes stored in RIB partition 20 that meets the criteria of the request for network routing information. Similarly, processing thread 26A may execute application logic 36 to process RIB partition 42A to determine the network routes stored in RIB partition 42A that meets the criteria of the request for network routing information.

To process a respective RIB partition, a thread may inspect each network route in the respective RIB partition to determine whether each network route stored in the RIB partition meets the criteria of the request for network routing information, and may perform filtering of the RIB partition for network routes in the RIB partition that meets the one or more criteria. For example, a thread may start from the network route with the smallest destination network prefix in the RIB partition and "walk" the entries in the respective RIB partition in ascending order of the destination network prefix to inspect each network route in the respective RIB partition. If the thread determines that a network route stored in the RIB partition meets the criteria of the request for network routing information, the thread may output information associated with the network route.

The information associated with the network route may include, for example, information contained in the RIB partition entry for the network route. Outputting information associated with a network route may include generating displayable information associated with the network route. Displayable information is information that is readable and understandable by users of computing device 2, such as textual information that can be displayed at a display device, such as at a display device of computing device 2. Thus for example, the displayable information for a network route may be the textual entry for the network route in the RIB partition. This is in contrast to producing information, such as binary data information, that has to be converted into readable information. By utilizing a plurality of threads, such as processing threads 26A-26N to generate displayable information, aspects of this disclosure may spread the processing cycles used to generate displayable information amongst multiple hardware processing cores of computing device 2, thereby reducing the amount of time that may be required for network device 12 to generate displayable information associated with the network route.

In the example of FIG. 1, main thread 28 may execute application logic 16 to process RIB partition 20 and to filter RIB 20 to determine network routes in RIB partition 20 that meet the criteria of the request for network routing information, generate displayable information associated with network routes in RIB partition 20 that meet the criteria of the request for network routing information, and to buffer the displayable information in local buffer 18. Similarly, route processing thread 26A may execute application logic 36 to process RIB partition 42A and to filter RIB partition 42A to determine network routes in RIB partition 42A that meet the criteria of the request for network routing information, and to output displayable information associated with network routes in RIB partition 42A that meet the criteria of the request for network routing information, generate displayable information associated with network routes in RIB partition 42A that meet the criteria of the request for network routing information, and to buffer the displayable information associated with network routes in thread buffer 40A. Each of route processing threads 26A-26N may similarly perform operations on a corresponding RIB partition and to buffer the displayable information from the corresponding partition in a corresponding thread buffer. Thus, for example, route processing thread 26N may perform operations on RIB partition 42N to generate displayable information and may buffer such displayable information in a corresponding thread buffer 40N.

A thread may be able to output displayable information associated with a network route while the thread is still processing the RIB partition and while the thread is inspecting other network routes in the RIB partition. As such, a thread does not need to wait until the thread has finished inspecting every network route in the RIB partition prior to buffering displayable information associated with network routes in the RIB partition that meet the criteria of the request for network routing information or prior to sending the network routes that meet the criteria of the request for network routing information to main thread 28. In this way, route processing threads 26A-26N and main thread 28 may be able to continuously output the requested displayable information to main thread 28.

Main thread 28 may receive the displayable information associated with network routes that meet the one or more criteria that are outputted by main thread 28 and route processing threads 26A-26N. Specifically, main thread 28 may perform read operations on main thread 28 and route processing threads 26A-26N to read and receive the information associated with network routes that are outputted by main thread 28 and route processing threads 26A-26N. For example, main thread 28 may execute message handler 43 to read the information associated with network routes that are stored in local buffer 18 in main thread 28.

Similarly, main thread 28 may execute message handler 43 to perform read operations on route processing threads 26A-26N by sending read requests to route processing threads 26A-26N. Route processing threads 26A-26N may, in response, send the displayable information associated with network route outputted by route processing threads 26A-26N to main thread 28. For example, main thread 26A may execute IPC output 34 to send displayable information associated with network routes that are stored in thread buffer 40A to network device 12 in response to receiving a read request from main thread 28.

In some examples, main thread 28 may read information from route processing threads 26A-26N one entry at a time. That is, in response to sending a read operation to a thread, main thread 28 may receive, from the thread, information associated with a single network route that has been generated by the thread. Main thread 28 may be able to send read operations to multiple threads in parallel, so that even though main thread 28 reads displayable information for a single network route at a time from a thread, main thread 28 may be able to send multiple read operations to multiple threads in parallel and may be able to receive displayable information for multiple network routes from multiple threads in parallel. Main thread 28 may continuously send read operations in parallel to producer 17 of main thread 28 and to route processing threads 26A-26N and may thereby receive a continuous stream of displayable information from main thread 28 and from route processing threads 26A-26N in parallel.

Main thread 28 may consolidate the displayable information received from route processing threads 26A-26N and main thread 28 associated with network routes that meet the one or more criteria and may output the consolidated displayable information associated with network routes that meet the one or more criteria to computing device 2. To consolidate the displayable information associated with network routes, main thread 28 may organize the information associated with network routes received from route processing threads 26A-26N and from main thread 28, such as sorting the displayable information associated with network routes, and may store the consolidated displayable information associated with network routes in a data structure, such as a tree, a table, a list, and the like. For example, main thread 28 may sort the displayable information associated with network routes according to a destination network prefix, such as a destination network address, and may store the consolidated displayable information in consolidated data 24, which may be a data structure such as a radix tree.

Main thread 28 may traverse the data structure of the consolidated data 24 to output the consolidated displayable information associated with network routes that meets the one or more criteria to computing device 2. For example, main thread 28 may output the consolidated information associated with network routes in a sorted order, such as according to the destination network addresses associated with the network routing information.

Main thread 28 may read the consolidated displayable information associated with network routes from consolidated data 24 and may buffer a portion of the consolidated displayable information in output buffer 21 for output to computing device 2. Main thread 28 may accordingly output the displayable information buffered in output buffer 21 to computing device 2. As main thread 28 reads displayable information from output buffer 21 and outputs the displayable information to computing device 2, main thread 28 may remove from output buffer 21 the displayable information outputted to computing device 2 and may buffer additional displayable information from consolidated data 24 in output buffer 21.

Main thread 28 may execute IPC output 10 to read information from output buffer 21 and to send the displayable information to computing device 2. As computing device 2 receives displayable information from output buffer 21, computing device 2 may output the received displayable information for display at a display, such as at user interface device 6. Because network device 12 sends displayable information to computing device 2, computing device 2 may not have to perform any conversion of the displayable information into a form that is readable to users of computing device 2. As such, if the displayable information received from network device 12 comprises textual information, computing device 2 may simply output the textual information in a CLI or GUI.

Main thread 28 may output the consolidated displayable information to computing device 2 before every thread has finished generating respective displayable information. As such, main thread 28 may output one or more portions of the complete set of consolidated displayable information associated with network routes stored in network device 12 that meet the one or more criteria while one or more threads continue to generate displayable information associated with network routes that meet the one or more criteria. In this way, network device 12 may not have to wait to finish generating a complete set of consolidated displayable information associated with network routes stored in network device 12 that meet the one or more criteria prior to outputting portions of the consolidated displayable information to computing device 2.

Main thread 28 may output the consolidated displayable information to computing device 2 in ways that provide a smooth stream of displayable information to computing device 2. Providing a smooth stream of displayable information may include main thread 28 outputting the consolidated displayable information at a regular rate and reducing the changes in the rate at which main thread 28 outputs the consolidated displayable information. However, different threads may perform the one or more commands at different rates. As such, different threads may output the displayable information to main thread 28 at different rates, and main thread 28 may correspondingly receive displayable information from different threads at different rates.

If main thread 28 is to produce the displayable information in a sorted order, a thread that is relatively slower in outputting the displayable information may act as a bottleneck that delays main thread from outputting displayable information produced by other threads. For example, a thread that is delayed in producing displayable information may delay main thread 28 from outputting displayable information that are later in the sorted order of displayable information until the delayed displayable information is produced. This may cause periods of time in which main thread 28 is not outputting displayable information to computing device 2, thereby potentially causing jitter in the output of the displayable information by computing device 2 to a display.

As such, main thread 28 may, in response to determining that an execution thread of a plurality of execution thread is bottlenecked, perform throttling of the remaining one or more execution threads of the plurality of execution threads to allow the bottlenecked thread to catch up to other threads in the production of displayable information. Main thread 28 may perform throttling of one or more threads by refraining from performing read operations on the one or more threads that main thread 28 is throttling. For example, to throttle route processing thread 26A, main thread 28 may refrain from performing read operations to read from route processing thread 26A. A thread may, in response to being throttled, temporarily cease performing the one or more commands to generate displayable information.

For example, if main thread 28 throttles route processing thread 26A, route processing thread 26A may temporarily cease performing the one or more commands to generate displayable information. When main thread 28 throttles route processing thread 26A and stops performing read operations on route processing thread 26A, route processing thread 26A may be unable to clear information from thread buffer 40A as a result of sending information stored in thread buffer 40A to main thread 28 in response to receiving read operations from main thread 28. As such, by ceasing performing of the one or more commands to generate displayable information, route processing thread 26A may prevent thread buffer 40A from being completely filled with displayable information.

In some examples, main thread 28 may identify a bottlenecked thread amongst the threads (e.g., route processing threads 26A-26N and main thread 28) based on determining a global minimum index associated with the displayable information produced by the threads. Each displayable information associated with a network route that is outputted by route processing threads 26A-26N and main thread 28 may be associated with an index, such as a numeric value indicated by metadata associated with each piece of displayable information. In some examples, the index for a displayable information may be a destination network prefix of the network route associated with the displayable information, such as a destination network address associated with the network route. In other examples, an index may be an integer such as 0, 1, 2, 3, and the like.

Main thread 28 may determine a plurality of indices, where each index in the plurality of indices is associated with the most recently received displayable information from each of route processing threads 26A-26N and main thread 28, and may associate each index with the thread that outputted the associated displayable information. Main thread 28 may therefore determine the global minimum index as the smallest index out of the indices associated with the most recently received displayable information from each of route processing threads 26A-26N and main thread 28. In the examples where the indices associated with the displayable information are destination network addresses, such as destination network prefixes of the network routes associated with the displayable information, the global minimum index may be referred to as the global minimum prefix.

To illustrate an example technique for determining a global minimum prefix, an example where two threads, main thread 28 and route processing thread 26A, produce displayable information is now described. Given a set of displayable information associated with corresponding prefixes 1, 2, 3, 4, 5, and 6 that are to be produced by main thread 28 and route processing thread 26A, application logic 16 of main thread 28 may be responsible for producing the displayable information associated with prefixes of 1, 2, and 6, and route processing thread 26A may be responsible for producing the displayable information associated with prefixes of 3, 4, and 5. If main thread 28 receives displayable information associated with a prefix of 1 from application logic 16 but has yet to receive displayable information associated with any prefixes from route processing thread 26A, main thread 28 may determine the global minimum prefix to 0 because main thread 28 has yet to receive displayable information from both main thread 28 and route processing thread 26A.

If main thread 28 subsequently receives displayable information associated with a prefix of 3 from route processing thread 26A while the most recently received displayable information received from application logic 16 is still the displayable information associated with a prefix of 1, main thread 28 may determine the global minimum prefix to be the prefix of 1 associated with main thread 28. Main thread 28 may subsequently receive displayable information associated with prefixes 2 and 6 from application logic 16 and may receive displayable information associated with a prefix of 4 from route processing thread 26A. Since the most recently received displayable information produced by main thread 28 is associated with a prefix of 6, and because the most recently received displayable information produced by route processing thread 26A is associated with a prefix of 4, main thread 28 may update the global minimum prefix to be the prefix of 4 associated with route processing thread 26A.

Main thread 28 may subsequently receive, from application logic 16, displayable information associated with a prefix that indicates app logic 16 has finished producing displayable information. Such a prefix may be a number larger than any real index or prefix value. For example, in the example where destination network addresses are used as prefixes, such a prefix may be a maximum allowable network address. Main thread 28 may also receive displayable information associated with a prefix of 5 from route processing thread 26A. Since application logic 16 of main thread 28 has finished producing displayable information, and because the most recently received displayable information produced by route processing thread 26A is associated with a prefix of 5, main thread 28 may update the global minimum prefix to be the prefix of 5 associated with route processing thread 26A.

Main thread 28 may subsequently receive, from route processing thread 26A, displayable information associated with a prefix that indicates route processing thread 26A has finished producing displayable information. Because both main thread 28 and route processing thread 26A have finished producing displayable information, main thread 28 may update the global minimum prefix to be a value that indicates all threads have finished producing displayable information.

As main thread 28 continues to receive pieces of displayable information from of route processing threads 26A-26N and main thread 28, main thread 28 may continuously determine the value of the global minimum index and the thread associated with the global minimum index. If the global minimum index remains the same value as main thread 28 continues to receive pieces of displayable information from of route processing threads 26A-26N and main thread 28, main thread 28 may identify the thread associated with the global minimum index as being bottlenecked.

In some examples, main thread 28 may sort the displayable information according to their associated indices and may sequentially output the displayable information to computing device 2 in order (e.g., increasing order) of their associated indices. Main thread 28 may refrain from crossing the global minimum index when outputting displayable information to computing device 2. Specifically, main thread 28 may refrain from outputting any piece of displayable information associated with an index that is greater than the current global minimum index to computing device 2. Thus, when outputting displayable information to computing device 2, main thread 28 may compare the index associated with a piece of displayable information to the global minimum index and may refrain from outputting the piece displayable information to computing device 2 if the index associated with the piece of displayable information is greater than the global minimum index. In this way, main thread 28 may maintain the lexicographic order of the displayable information by preventing the outputting of displayable information associated with a relatively higher index before outputting displayable information associated with a relatively lower index.

Main thread 28 may, in response to refraining from outputting a piece displayable information to computing device 2 because the index associated with the piece of displayable information is greater than the global minimum index, determine that the thread associated with the global minimum index is bottlenecked. Main thread 28 may, in response to determining that the thread associated with the global minimum index is bottlenecked, perform throttling of the other threads that are producing displayable information, such as by refraining from performing read operations on the other threads until the global minimum index changes in value and main thread 28 is able to once again output displayable information to computing device 2.

In some examples, to prevent a thread that has finished producing displayable information from causing main thread 28 to throttle other threads that are still in the process of producing displayable information, the thread that has finished producing displayable information may use a value that is larger than any value in the range of index values for route processing threads 26A-26N and main thread 28 as the index for the last piece of displayable information that it sends to main thread 28. By using such a value as the index, the main thread 28 may never identify the associated thread as being associated with the global minimum index, and therefore may not determine the thread as being bottlenecked even when the thread does not output any additional displayable information.

In some examples, rather than or in addition to computing device 2 that communicates requests with main thread 28 of network device 12, computing device 2 may also directly communicate with one or more other processes executing in network device 12 to send a request for network routing information to the one or more other processes executing in network device 12. For example, because network device 12 may execute different processes that operate on different RIB partitions, such as RIB partitions that store network routes for different non-overlapping ranges of destination network addresses, a process of network device 12 may be able to directly handle a request from computing device 2 for information regarding network routes stored in the RIB partition associated with the process.

In the example of FIG. 1, computing device 2 may send a request to network device 12 for network routing information regarding network routes having a range of destination network addresses. If the network routes having the specified range of destination network addresses are stored in RIB partition 42A, IPC input 32 of route processing thread 26A may receive the request from network device 12 in order to determine information regarding network routes stored in RIB partition 42A that meet one or more criteria specified by the request. For example, request handler 38 may process the request received by IPC input 32 to spawn application logic 36 to walk RIB partition 42A to determine network routes that meet the one or more criteria of the request and may buffer displayable information regarding the network routes in thread buffer 40A for output by IPC output 34 to computing device 2. As application logic 36 processes RIB partition 42A to determine the network routes that meet the one or more criteria of the request, application logic 36 may sort the displayable information regarding the network routes in lexicographic order in thread buffer 40A, such as in ascending order of destination network addresses starting with the smallest destination network address. Route processing thread 26A may therefore execute IPC output 34 to stream the displayable information regarding the network routes determined by application logic 36 to computing device 2 for display in CLI 44.

Figure 2:
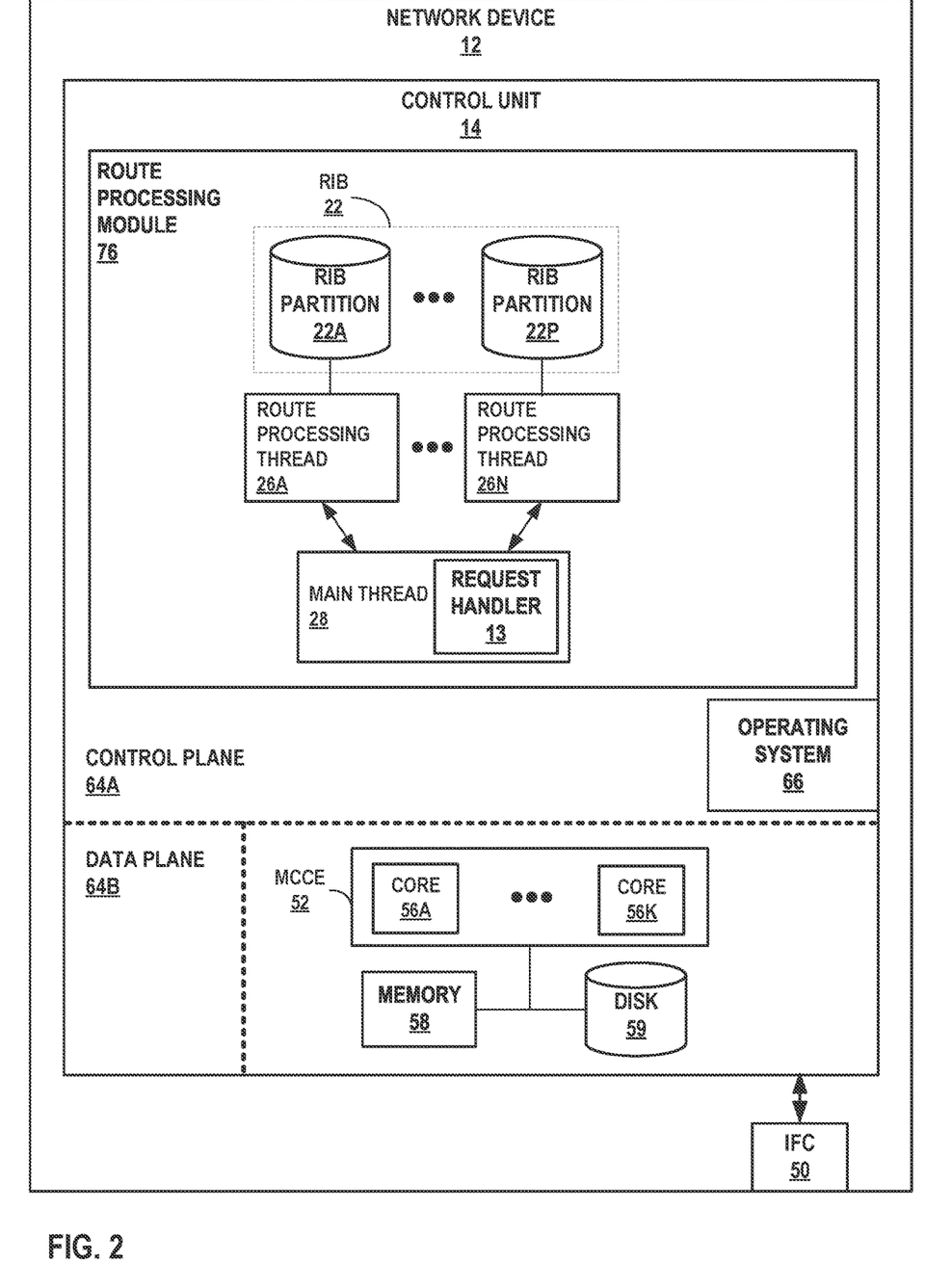
FIG. 2 is a block diagram illustrating an example network device configured to execute parallel route processing threads, according to techniques of this disclosure.

FIG. 2 is a block diagram illustrating an example network device configured to execute parallel route processing threads according to techniques of this disclosure. As shown in FIG. 2, network device 12 includes a multi-core computing environment 52 that includes a plurality of CPU processors or cores 56A-56K (collectively, "cores 56"), where "K" is an integer greater than one. Multi-core computing environment 52 may include any number of processors and any number of hardware cores from, for example, four to thousands. Each of processing cores 56 each includes an independent execution unit to perform instructions that conform to an instruction set architecture for the core.

Processing cores 56 may each be implemented as separate integrated circuits (ICs) or may be combined within one or more multi-core processors (or "many-core" processors) that are each implemented using a single IC (i.e., a chip multiprocessor), package, or die. Alternatively, or in addition, multi-core computing environment 52 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. As used herein, a "processor" or "processing circuitry" may refer to one or more cores 56.

Memory 58 represents a main memory. Examples of memory 58 include non-transitory computer-readable mediums including memory such as random-access memory (RAM) (including various forms of dynamic RAM (DRAM), e.g., DDR2 SDRAM and DDR3), or static RAM (SRAM), and Flash memory. Storage disk 59 is a form of fixed or removable storage medium that can be used to carry or store desired program code and program data in the form of instructions or data structures and that can be accessed by a processor, or any other type of volatile or non-volatile memory that stores instructions to cause the one or more cores 56 to perform techniques described herein. Examples of storage device 59 include a disk drive and/or an optical drive.

Multi-core computing environment 52, memory 58, and storage device 59 provide a hardware operating environment for a control unit 14 that performs control plane 64A and, in some cases, forwarding or data plane 64B functionality for network device 12. That is, in this example, control unit 14 is divided into two logical or physical "planes" to include a first control or routing plane 64A ("control plane 64A") and a second data or forwarding plane 64B ("data plane 64B"). That is, control unit 14 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 64A defines control plane functionality of network device 12. Control plane 64A manages and controls the behavior of network device 12, including the behavior of data plane 64B. Operating system 66 of control plane 64A provides a run-time environment for multiple different processes each made up of one or more execution threads. Operating system 66 may represent, for example, a UNIX operating system derivative such as Linux or Berkeley Software Distribution (BSD). Operating system 66 may offer libraries and drivers by which processes may interact with data plane 64B, for example, or other hardware of network device 12, including a filesystem and main memory for network device 12. Libraries and drivers of operating system 66 may include Application Programming Interfaces (APIs) that provide standard interfaces for developers to invoke the functionality of operating system 66 and network device 12 exposed by the libraries and drivers. Operating system 66 supports multi-threading for multiple software execution threads. Although described with respect to a network device 12 that includes a data plane 64B for forwarding packets in accordance with routing information including received routes, the techniques of this disclosure are applicable to network devices, such as controllers and route reflectors, that perform control plane 64A operations but may perform limited data plane 64B operations with respect to forwarding packets in accordance with routing information including received routes. In some cases, the control plane 64A and data plane 64B are not co-located within a single network device chassis but are distributed among multiple devices. For example, examples of network device 12 that are controllers may perform the techniques described herein with respect to route processing and program, using software-defined network (SDN) techniques, one or more network nodes with forwarding information to implement the realize the routes within the network.

Network device 12 includes one or more network interface card(s) 50 coupled to control unit 14 via a bus or other communication links. Interface card(s) include one or more ports configured to receive network cables to couple network device 12 to other network devices that advertise routes according to a routing protocol.

Control unit 14 is configured to execute a route processing module 76, which represents one or more computer processes for processing of network routes stored by network device 12 to determine information requested by a computing device, such as computing device 2 of FIG. 1. For example, network device 12 may receive, from a computing device, a request for information associated with network routes that meet one or more criteria, such as via IFC 50, and control unit 14 may, in response, execute route processing module 76 to generate displayable information associated with network routes that meet the one or more criteria. Network device 12 may output the displayable information to the requesting computing device, such as via IFC 50.

Route processing module 76 includes multiple software execution threads 26 and 28, each of which may execute on a different one of cores 56. Threads 26 and 28 may be scheduled by operating system 66 for execution by cores 56 according to a multi-threading scheduling scheme, e.g., using time-slicing, and route processing module 76 may represent an overall software process having the multiple software execution threads.

In accordance with techniques described herein, route processing module 76 includes multiple, concurrently executing, route processing software threads 26 and 28 for distributing and performing distributed processing of routes in response to network device 12 receiving a request for information associated with network routes that meet one or more criteria. Route processing threads 26 may be substantially similar in that each of routing processing threads 26 separate executes similar operations for processing routing protocol messages received by network device 12. Operating system 66 may schedule two or more route processing threads 26 and main thread 28 to execute at least partially concurrently on respective cores 56 such that multiple route processing threads 26 may execute at least partially in parallel to process respective routing protocol messages concurrently. In addition, although the techniques are described primarily with respect to a single multi-threaded process (i.e., route processing module 76), the techniques may be applied using multiple threads executing within different processes located on a single network device or distributed among multiple different network devices.

Route processing threads 26 and main thread 28 manage respective, separate partitions of routing information in the form of routing information base (RIB) partitions 22A-22P, which includes the example RIB partition 20 and RIB partition 42A of FIG. 1. Each of RIB partitions 22 stores a different portion of routes that make up the overall RIB 22 for network device.

Main thread 28 may execute on multi-core computing environment 52 to receive, via IFC(s) 50, a request for information associated with network routes stored in network device 12 that meet one or more criteria. Main thread 28 may include request handler 13 that routes an indication of the request to one or more of route processing threads 26 so that one or more of route processing threads 26 and main thread 28 may each process a respective RIB partition of RIB 22 to determine the subset of the network routes in the respective RIB partition that meet the one or more criteria and to generate displayable information associated with the network routes that meet the one or more criteria.

For example, processing threads 26 and main thread 28 may each traverse a respective RIB partition of RIB 22 to filter the respective RIB partition for network routes that meet the one or more criteria, and may, for each network route that meets the one or more criteria, generate displayable information, such as textual information, associated with the network route. processing threads 26 and main thread 28 may buffer the generated displayable information and may send such buffered displayable information to main thread 28 upon receiving a read request from main thread 28.

Main thread 28 may receive the displayable information generated by processing threads 26 and may generate consolidated displayable information based on the displayable information generated by each of route processing threads 26 and main thread 28. For example, main thread 28 may continuously perform read operations on two or more of route processing threads 26 in parallel to receive the displayable information generated by processing threads 26. Main thread 28 may consolidate the displayable information received from processing threads 26 and may stream the consolidated displayable information to the requesting computing device, such as via IFC 50. Main thread 28 may consolidate the displayable information by sorting the displayable information received from route processing threads 26. For example, main thread 28 may sort the displayable information using a radix tree data structure.

In some examples, main thread 28 may detect that a thread is bottlenecked and may, in response, throttle other threads to prevent other threads from continuing to produce displayable information. A thread that is bottlenecked may be a thread that is producing displayable information at a slower rate than other threads. To determine whether a thread is bottlenecked, main thread 28 may determine an index associated with each of route processing threads 26 and main thread 28, where the index associated with a thread is an index associated with the most recently received displayable information from the thread. Main thread 28 may determine a global minimum index as the index with the lowest value out of the indices associated with the most recently received displayable information from route processing threads 26 and main thread 28, and may associate the global minimum index with the thread that produced the displayable information associated with the index with the lowest value out of the indices.

Main thread 28 may determine, based on the global minimum index, whether the thread associated with the global minimum index is bottlenecked. In one example, because main thread 28 may not output any displayable information that has an associated index higher than the global minimum index, main thread may determine that the thread associated with the global minimum index is bottlenecked if main thread 28 is unable to output any displayable information for a specified period, such as a specified period of time, a specified number of processing cycles, and the like.

If main thread 28 determines that a thread is bottlenecked, main thread 28 may throttle other threads that are producing displayable information. For example, main thread 28 may cease performing read operations on other threads that are producing displayable information and may direct the other threads to cease producing displayable information until the thread is no longer bottlenecked. Main thread 28 may, in response to determining that the value of the global minimum index has changed, determine that the thread is no longer bottlenecked, and may cease throttling the other threads.

Figure 3:
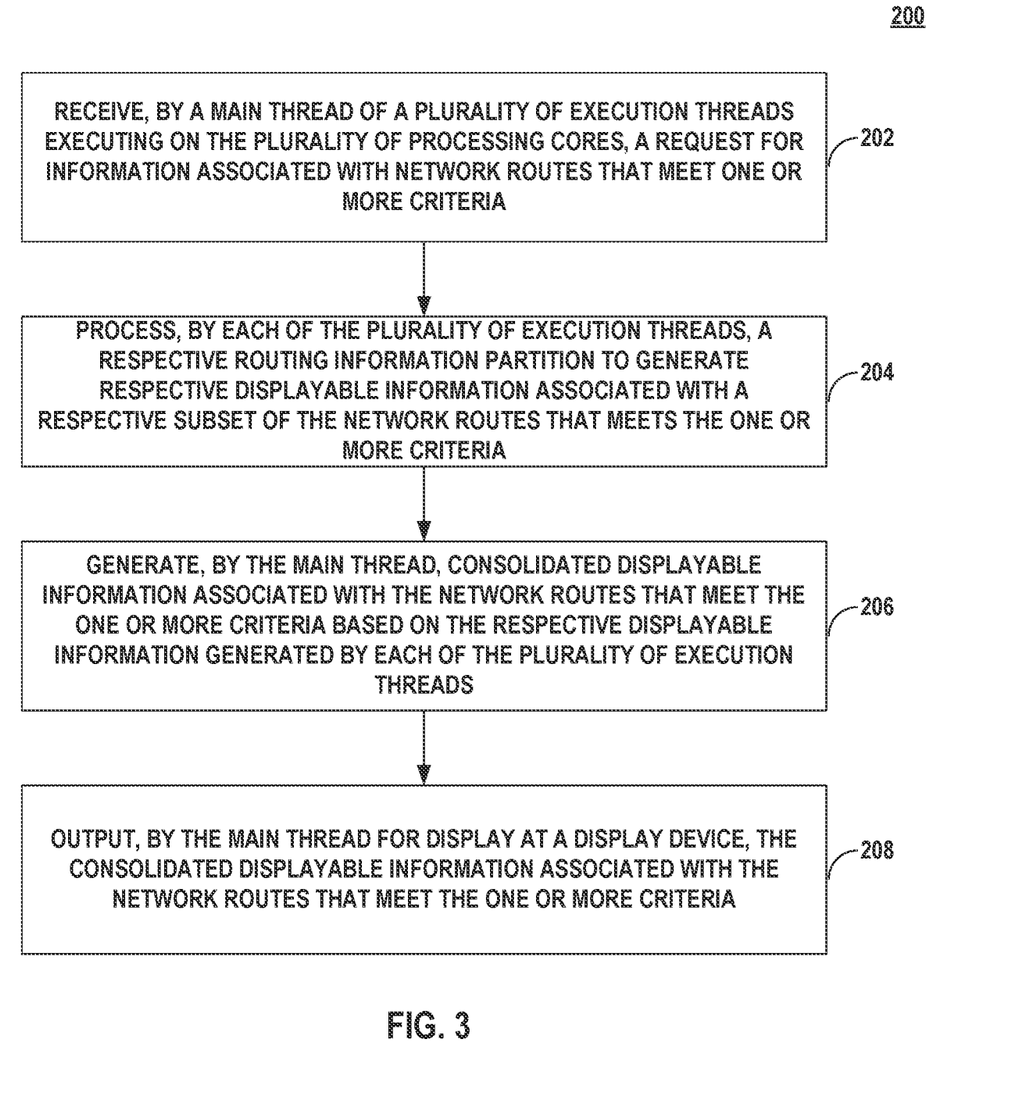
FIG. 3 is a flowchart illustrating an example mode of operation for route processing, according to techniques of this disclosure.

FIG. 3 is a flowchart illustrating an example mode of operation for route processing, according to techniques of this disclosure. For purposes of examples, operation 200 is described with respect to FIGS. 1 and 2.

As shown in FIG. 3, main thread 28 of a plurality of execution threads executing on a plurality of processing cores of at least one hardware-based processor of a network device 12 may receive a request for information associated with network routes that meet one or more criteria (202).

Each of the plurality of execution threads 26 and 28 may process a respective routing information partition to generate respective displayable information associated with a respective subset of the network routes that meets the one or more criteria (204).

Main thread 28 may generate a consolidated displayable information associated with the network routes that meet the one or more criteria based on the respective displayable information generated by each of the plurality of execution threads 26 and 28 (206).

Main thread 28 may output, for display at a display device, the consolidated displayable information associated with the network routes that meet the one or more criteria (208).

In some examples, main thread 28 may determine that an execution thread of the plurality of execution threads is bottlenecked and may, in response to determining that the execution thread is bottlenecked, throttle one or more other execution threads of the plurality of execution threads.

In some examples, to determine that the execution thread of the plurality of execution threads is bottlenecked, main thread 28 may determine a plurality of indices, where each index in the plurality of indices is associated with a most recently received displayable information from a respective execution thread out of the plurality of execution threads. Main thread may determine a global minimum index as a smallest index out of the plurality of indices. Main thread may determine that the execution thread is bottlenecked based at least in part on the global minimum index being associated with displayable information most recently received from the execution thread. In some examples, the plurality of indices may include a plurality of destination network prefixes, and the global minimum index may be a global minimum prefix.

In some examples, to determine that the execution thread is bottlenecked based at least in part on the global minimum index being associated with the displayable information most recently received from the execution thread, main thread 28 may, in response to the main thread outputting displayable information generated by the execution thread associated with the global minimum index, determine that the execution thread is bottlenecked.

In some examples, to throttle the one or more other execution threads, main thread 28 may refrain from performing read operations on the one or more other execution threads until the global minimum index changes in value.

In some examples, to throttle the remaining one or more execution threads, main thread 28 may refrain from outputting displayable information associated with an index that is greater than the global minimum index. After refraining from outputting the displayable information, main thread 28 may, in response to determining that the global minimum index has increased to be greater than or equal to the index, output the displayable information associated with the index In some examples, the respective displayable information and the consolidated displayable information comprise textual information displayable by a display.

In some examples, to process, by each of the plurality of execution threads, the respective routing information partition to generate the respective displayable information associated with a respective subset of the network routes that meets the one or more criteria, each of the plurality of execution threads may filter each network route in the respective routing information partition to determine the respective subset of the network routes that meets the one or more criteria.

In some examples, to output the consolidated displayable information associated with the network routes that meet the one or more criteria, main thread 28 may further output one or more portions of the consolidated displayable information associated with the network routes that meet the one or more criteria while one or more of the plurality of execution threads continue to generate one or more respective displayable information associated with one or more respective subsets of the network routes that meets the one or more criteria.

The disclosure includes the following examples.

Example 1: A method includes receiving, by a main thread of a plurality of execution threads executing on a plurality of processing cores of at least one hardware-based processor of a network device, a request for information associated with network routes that meet one or more criteria; processing, by each of the plurality of execution threads, a respective routing information partition to generate respective displayable information associated with a respective subset of the network routes that meets the one or more criteria; generating, by the main thread, consolidated displayable information associated with the network routes that meet the one or more criteria based on the respective displayable information generated by each of the plurality of execution threads; and outputting, by the main thread, for display at a display device, the consolidated displayable information associated with the network routes that meet the one or more criteria.

Example 2: The method of example 1, further includes determining, by the main thread, that an execution thread of the plurality of execution threads is bottlenecked; and in response to determining that the execution thread is bottlenecked, throttling, by the main thread, one or more other execution threads of the plurality of execution threads.

Example 3: The method of example 2, wherein determining that the execution thread of the plurality of execution threads is bottlenecked further comprises: determining, by the main thread, a plurality of indices, wherein each index in the plurality of indices is associated with a most recently received displayable information from a respective execution thread out of the plurality of execution threads; determining, by the main thread, a global minimum index as a smallest index out of the plurality of indices; and determining, by the main thread, that the execution thread is bottlenecked based at least in part on the global minimum index being associated with displayable information most recently received from the execution thread.

Example 4: The method of example 3, wherein determining that the execution thread is bottlenecked based at least in part on the global minimum index being associated with the displayable information most recently received from the execution thread further comprises: in response to the main thread outputting information generated by the execution thread associated with the global minimum index, determining, by the main thread, that the execution thread is bottlenecked.

Example 5: The method of any of examples 3 and 4, wherein throttling the one or more other execution threads comprises: refraining, by the main thread, from performing read operations on the one or more other execution threads until the global minimum index changes in value.

Example 6: The method of any of examples 3-5, further includes refraining, by the main thread, from outputting displayable information associated with an index that is greater than the global minimum index; and after the refraining, in response to determining the global minimum index has increased to be greater than or equal to the index, outputting the displayable information associated with the index.

Example 7: The method of any of examples 3-6, wherein the plurality of indices comprises a plurality of destination network prefixes, and wherein the global minimum index comprises a global minimum prefix.

Example 8: The method of any of examples 1-7, wherein the respective displayable information and the consolidated displayable information comprise textual information displayable by a display.

Example 9: The method of any of examples 1-8, wherein processing, by each of the plurality of execution threads, the respective routing information partition to generate the respective displayable information associated with a respective subset of the network routes that meets the one or more criteria further comprises: filtering, by each of the plurality of execution threads, each network route in the respective routing information partition to determine the respective subset of the network routes that meets the one or more criteria.

Example 10: The method of any of examples 1-9, wherein outputting, by the main thread, the consolidated displayable information associated with the network routes that meet the one or more criteria comprises: outputting, by the main thread, one or more portions of the consolidated displayable information associated with the network routes that meet the one or more criteria while one or more of the plurality of execution threads continue to generate one or more respective displayable information associated with one or more respective subsets of the network routes that meets the one or more criteria.

Example 11: A network device includes a network interface card; and at least one hardware-based processor comprising a plurality of processing cores for executing a plurality of execution threads, the at least one hardware-based processor configured to: receive, by a main thread of a plurality of execution threads executing on the plurality of processing cores, a request for information associated with network routes that meet one or more criteria; process, by each of the plurality of execution threads, a respective routing information partition to generate respective displayable information associated with a respective subset of the network routes that meets the one or more criteria; generate, by the main thread, consolidated displayable information associated with the network routes that meet the one or more criteria based on the respective displayable information generated by each of the plurality of execution threads; and output, by the main thread for display at a display device, the consolidated displayable information associated with the network routes that meet the one or more criteria.

Example 12: The network device of example 11, wherein the at least one hardware-based processor is further configured to: determine, by the main thread, that an execution thread of the plurality of execution threads is bottlenecked; and in response to determining that the execution thread is bottlenecked, throttle, by the main thread, one or more other execution threads of the plurality of execution threads.

Example 13: The network device of example 12, wherein to determine that the execution thread of the plurality of execution threads is bottlenecked, the at least one hardware-based processor is further configured to: determine, by the main thread, a plurality of indices, wherein each index in the plurality of indices is associated with a most recently received displayable information from a respective execution thread out of the plurality of execution threads; determine, by the main thread, a global minimum index as a smallest index out of the plurality of indices; and determine, by the main thread, that the execution thread is bottlenecked based at least in part on the global minimum index being associated with displayable information most recently received from the execution thread.

Example 14: The network device of example 13, wherein to determine that the execution thread is bottlenecked based at least in part on the global minimum index being associated with the displayable information most recently received from the execution thread, the at least one hardware-based processor is further configured to: in response to the main thread outputting information generated by the execution thread associated with the global minimum index, determine, by the main thread, that the execution thread is bottlenecked.

Example 15: The network device of any of examples 13 and 14, wherein to throttle the one or more other execution threads, the at least one hardware-based processor is further configured to: refrain, by the main thread, from performing read operations on the one or more other execution threads until the global minimum index changes in value.

Example 16: The network device of any of examples 13-15, wherein the at least one hardware-based processor is further configured to: refrain, by the main thread, from outputting displayable information associated with an index that is greater than the global minimum index; and after the refraining, in response to determining the global minimum index has increased to be greater than or equal to the index, output the displayable information associated with the index.

Example 17: The network device of any of examples 13-16, wherein the plurality of indices comprises a plurality of destination network prefixes, and wherein the global minimum index comprises a global minimum prefix.

Example 18: The network device of any of examples 11-17, wherein the respective displayable information and the consolidated displayable information comprise textual information displayable by a display.

Example 19: The network device of any of examples 11-18, wherein to process, by each of the plurality of execution threads, the respective routing information partition to generate the respective displayable information associated with a respective subset of the network routes that meets the one or more criteria, the at least one hardware-based processor is further configured to: filter, by each of the plurality of execution threads, each network route in the respective routing information partition to determine the respective subset of the network routes that meets the one or more criteria.

Example 20: A non-transitory computer-readable medium comprising instructions that, when executed, cause one or more hardware-based processors of a network device to perform operations includes receiving, with a main thread of a plurality of execution threads configured for execution on a plurality of processing cores of the one or more hardware-based processors of a network device, a request for information associated with network routes that meet one or more criteria; processing, by each of the plurality of execution threads, a respective routing information partition to generate respective displayable information associated with a respective subset of the network routes that meets the one or more criteria; generating, by the main thread, consolidated displayable information associated with the network routes that meet the one or more criteria based on the respective displayable information generated by each of the plurality of execution threads; and outputting, by the main thread for display at a display device, the consolidated displayable information associated with the network routes that meet the one or more criteria.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
   receiving, by a main thread of a plurality of execution threads executing on a plurality of processing cores of at least one hardware-based processor of a network device, a request for information associated with network routes that meet one or more criteria;
   processing, by each of the plurality of execution threads, a respective routing information partition to generate respective displayable information associated with a respective subset of the network routes that meets the one or more criteria;
   determining, by the main thread, a plurality of indices, wherein each index in the plurality of indices is associated with a most recently received displayable information from a corresponding execution thread out of the plurality of execution threads;
   determining, by the main thread, a global minimum index as a smallest index out of the plurality of indices;
   determining, by the main thread, that an execution thread of the plurality of execution threads is delayed in producing displayable information based at least in part on the global minimum index being associated with the most recently received displayable information from the execution thread;
   in response to determining that the execution thread is delayed in producing displayable information, throttling, by the main thread, one or more other execution threads of the plurality of execution threads;
   generating, by the main thread, consolidated displayable information associated with the network routes that meet the one or more criteria based on the respective displayable information generated by each of the plurality of execution threads; and
   outputting, by the main thread, for display at a display device, the consolidated displayable information associated with the network routes that meet the one or more criteria.

2. The method of claim 1, wherein determining that the execution thread is delayed in producing displayable information based at least in part on the global minimum index being associated with the displayable information most recently received from the execution thread further comprises:
   in response to the main thread outputting information generated by the execution thread associated with the global minimum index, determining, by the main thread, that the execution thread is delayed in producing displayable information.

3. The method of claim 1, wherein throttling the one or more other execution threads comprises:
   refraining, by the main thread, from performing read operations on the one or more other execution threads until the global minimum index changes in value.

4. The method of claim 1, further comprising:
   refraining, by the main thread, from outputting displayable information associated with an index that is greater than the global minimum index; and
   after the refraining, in response to determining the global minimum index has increased to be greater than or equal to the index, outputting the displayable information associated with the index.

5. The method of claim 1, wherein the plurality of indices comprises a plurality of destination network prefixes, and wherein the global minimum index comprises a global minimum prefix.

6. The method of claim 1, wherein processing, by each of the plurality of execution threads, the respective routing information partition to generate the respective displayable information associated with a respective subset of the network routes that meets the one or more criteria further comprises:
  filtering, by each of the plurality of execution threads, each network route in the respective routing information partition to determine the respective subset of the network routes that meets the one or more criteria.

7. The method of claim 1, wherein outputting, by the main thread, the consolidated displayable information associated with the network routes that meet the one or more criteria comprises:
  outputting, by the main thread, one or more portions of the consolidated displayable information associated with the network routes that meet the one or more criteria while one or more of the plurality of execution threads continue to generate one or more respective displayable information associated with one or more respective subsets of the network routes that meets the one or more criteria.

8. A network device comprising:
  a network interface card; and
  at least one hardware-based processor comprising a plurality of processing cores for executing a plurality of execution threads, the at least one hardware-based processor configured to:
    receive, by a main thread of a plurality of execution threads executing on the plurality of processing cores, a request for information associated with network routes that meet one or more criteria;
    process, by each of the plurality of execution threads, a respective routing information partition to generate respective displayable information associated with a respective subset of the network routes that meets the one or more criteria;
    determine, by the main thread, a plurality of indices, wherein each index in the plurality of indices is associated with a most recently received displayable information from a corresponding execution thread out of the plurality of execution threads;
    determine, by the main thread, a global minimum index as a smallest index out of the plurality of indices;
    determine, by the main thread, that an execution thread of the plurality of execution threads is delayed in producing displayable information based at least in part on the global minimum index being associated with the most recently received displayable information from the execution thread;
    in response to determining that the execution thread is delayed in producing displayable information, throttle, by the main thread, one or more other execution threads of the plurality of execution threads;
    generate, by the main thread, consolidated displayable information associated with the network routes that meet the one or more criteria based on the respective displayable information generated by each of the plurality of execution threads; and
    output, by the main thread for display at a display device, the consolidated displayable information associated with the network routes that meet the one or more criteria.

9. The network device of claim 8, wherein to determine that the execution thread is delayed in producing displayable information based at least in part on the global minimum index being associated with the displayable information most recently received from the execution thread, the at least one hardware-based processor is further configured to:
  in response to the main thread outputting information generated by the execution thread associated with the global minimum index, determine, by the main thread, that the execution thread is delayed in producing displayable information.

10. The network device of claim 8, wherein to throttle the one or more other execution threads, the at least one hardware-based processor is further configured to:
  refrain, by the main thread, from performing read operations on the one or more other execution threads until the global minimum index changes in value.

11. The network device of claim 8, wherein the at least one hardware-based processor is further configured to:
  refrain, by the main thread, from outputting displayable information associated with an index that is greater than the global minimum index; and
  after the refraining, in response to determining the global minimum index has increased to be greater than or equal to the index, output the displayable information associated with the index.

12. The network device of claim 8, wherein the plurality of indices comprises a plurality of destination network prefixes, and wherein the global minimum index comprises a global minimum prefix.

13. The network device of claim 8, wherein to process, by each of the plurality of execution threads, the respective routing information partition to generate the respective displayable information associated with a respective subset of the network routes that meets the one or more criteria, the at least one hardware-based processor is further configured to:
  filter, by each of the plurality of execution threads, each network route in the respective routing information partition to determine the respective subset of the network routes that meets the one or more criteria.

14. A non-transitory computer-readable medium comprising instructions that, when executed, cause one or more hardware-based processors of a network device to perform operations comprising:
  receiving, with a main thread of a plurality of execution threads configured for execution on a plurality of processing cores of the one or more hardware-based processors of a network device, a request for information associated with network routes that meet one or more criteria;
  processing, by each of the plurality of execution threads, a respective routing information partition to generate respective displayable information associated with a respective subset of the network routes that meets the one or more criteria;
  determining, by the main thread, a plurality of indices, wherein each index in the plurality of indices is associated with a most recently received displayable information from a corresponding execution thread out of the plurality of execution threads;
  determining, by the main thread, a global minimum index as a smallest index out of the plurality of indices;
  determining, by the main thread, that an execution thread of the plurality of execution threads is delayed in producing displayable information based at least in part on the global minimum index being associated with the most recently received displayable information from the execution thread;
  in response to determining that the execution thread is delayed in producing displayable information, throttling, by the main thread, one or more other execution threads of the plurality of execution threads;

generating, by the main thread, consolidated displayable information associated with the network routes that meet the one or more criteria based on the respective displayable information generated by each of the plurality of execution threads; and outputting, by the main thread for display at a display device, the consolidated displayable information associated with the network routes that meet the one or more criteria.

\* \* \* \* \*